United States Patent

Gosselin et al.

[11] Patent Number: 5,345,662
[45] Date of Patent: Sep. 13, 1994

[54] APPARATUS FOR INSERTING A SPLINE INTO A FRAME GROOVE

[75] Inventors: Louis Gosselin, St-Nicolas; Normand Robichaud, Québec, both of Canada

[73] Assignee: Langis Lambert, St-Apollinaire, Canada

[21] Appl. No.: 27,804

[22] Filed: Mar. 8, 1993

[51] Int. Cl.$^5$ .............................................. B23P 19/02
[52] U.S. Cl. ...................................................... 29/235
[58] Field of Search ................. 29/235, 450, 451, 452, 29/701; 140/109; 414/744 A, 786; 901/36, 37

[56] References Cited

U.S. PATENT DOCUMENTS 4,780,943 11/1988 St. Angelo et al. .................. 29/235

Primary Examiner—Robert C. Watson
Attorney, Agent, or Firm—Robic

[57] ABSTRACT

The apparatus comprises a spline inserting wheel, a motor for rotating the wheel, and a support mountable to a fixed structure having one end manually moveable over a frame supporting table surface. The wheel is rotatably mounted to one end of the support about an axis normal to the table surface, and a pneumatic cylinder applies a downward pressure on the wheel. The spline can be inserted into the frame by moving the support to locate the wheel over the groove and spline, applying pressure to the wheel to insert the spline into the groove, and driving the wheel to advance the wheel over the groove to insert the spline along the groove, while rotating the wheel about the normal axis to follow the groove.

7 Claims, 3 Drawing Sheets

APPARATUS FOR INSERTING A SPLINE INTO A FRAME GROOVE

FIELD OF THE INVENTION

The present invention relates to an apparatus for inserting a spline into a frame groove. The invention may be used for example for inserting a rubber spline into the groove of a window screen frame for manufacturing window screens.

BACKGROUND OF THE INVENTION

Apparatus for seating or inserting splines or strips into frame grooves for assembling screens or other fabric covered frames are known in the art for the purposes of facilitating assembly.

Generally, a window screen is made by assembling a frame of extruded edge members provided with a groove for receiving a spline for holding the screen. A sheet of screen material is cut to size and placed over the frame, and the spline or strip is forced into the groove lodging an edge of the screen with the spline in the groove. Once the spline is inserted at one point, the entire length of spline is inserted into the entire length of the groove by continuing to insert the spline while advancing around the frame in one direction. When this operation is done manually, a tool is used such as for example the one disclosed in U.S. Pat. No. 5,072,471. Usually, a small leftover portion of the screen remains on the outside, and this portion is trimmed with a knife.

Devices are known in the art for either partly or fully automatically inserting the spline into the frame groove. U.S. Pat. Nos. 5,052,093 and 5,127,143 describe apparatus in which a screen placed along the edge of a supporting surface can have its spline inserted into its groove along one side member of the screen by either pulling a spline seating wheel along an edge of the table, or by moving the frame on a carriage along the surface of the table passing underneath a spline seating wheel, respectively. In both cases, the wheel is clamped into a seating position and can be raised above the frame to allow the screen to be repositioned to do another side member of the frame. U.S. Pat. Nos. 4,766,661 and 5,018,264 describe apparatus in which a carriage is mounted on a transverse gantry for moving the carriage transversely, the gantry being movable lengthwise so that the carriage can move over the entire surface of a table. A seal fitting wheel is mounted to the carriage and the carriage is driven while applying pressure to the wheel to insert a spline into a groove of the frame. In U.S. Pat. No. 4,766,661, the apparatus also positions the screen material over the frame and cuts the screen material as the spline is automatically inserted in front of the spline inserting wheel.

It has been found that in the prior art spline inserting apparatus, too much manual labor is required to insert the splines into the frame grooves, or that the apparatus is sophisticated and expensive to install.

SUMMARY OF THE INVENTION

It is therefore an object of the present invention to provide a spline inserting apparatus for inserting a spline into a frame groove in which the spline can be inserted rapidly when operated by a single operator without having to resort to expensive equipment to provide the apparatus.

According to the invention there is provided an apparatus for inserting a spline into a frame groove comprising a spline inserting wheel, a motor for rotating the spline inserting wheel, a support mountable to a fixed structure having one end manually moveable over a frame supporting table surface, means for rotatably mounting the wheel to the one end of the support, the wheel being rotatable about an axis substantially normal to the surface, and means for applying a downward pressure on the wheel, whereby the spline can be inserted into the frame by moving the support to locate the wheel over the groove and spline, applying pressure to the wheel to insert the spline into the groove, and driving the wheel to advance the wheel over the groove to insert the spline along the groove, while rotating the wheel about the axis to follow the groove.

The support may comprise two pivot arms hinged together with one end moveable over a table surface, and another end securely mounted to a fixed structure, the arms moving in a horizontal plane. The rotatable mounting means may comprise a pair of parallel arms connecting pivotally between a bearing member and the one end of the support, so that the bearing may receive a unit comprising the motor and the spline inserting wheel to rotate about a vertical axis, and as the rotatable mounting means pivot with respect to the support the bearing is raised and lowered without causing any small deviation from the normal axis of rotation. The means for applying a downward pressure on the wheel may comprise an air cylinder providing a force to the parallel arms from the support in order to raise and apply a downward force to the bearing of the rotatable mounting means, thus transferring a downward pressure on the wheel.

The motor and spline inserting wheel may be part of a unit including a handle for turning the unit about the vertical axis, and controls for the motor and means for applying a downward pressure. The motor may be driven by air pressure and may operate at at least two speeds, a first low speed for slowly advancing the spline inserting wheel as the wheel approaches corners of the frame, and a second high speed as the wheel is inserting the spline along the length of the sides of the frame.

The invention also provides an apparatus for inserting a spline into a frame groove, comprising a rectangular frame supporting table having a surface which is inclined with a lower front side and an upper rear side, a spline inserting wheel, a motor for rotating said wheel, a support having one end manually moveable over the table surface, the support comprising a pair of articulated arms pivotally mounted at another end near a middle portion of the rear side of the table, means for rotatably mounting the wheel to the one end of the support, the wheel being rotatable about an axis substantially normal to the table surface, and means for applying a downward pressure on said wheel. In this way, access to the upper rear side from the lower front side is facilitated by this inclination of the table.

The spline may be a rubber circular cross-sectioned strip or any other flexible or partly-flexible member which may be inserted into the groove to fasten therein a screen or sheet. The spline and groove may be integral parts of the ends of a plastic C-shaped member to be closed using pressure to fasten the screen between the spline and groove.

The invention will be better understood by way of the following non-limiting description of a preferred embodiment of the invention with reference to the appended drawings.

DETAILED DESCRIPTION OF THE PREFERRED EMBODIMENTS

Figure 1:
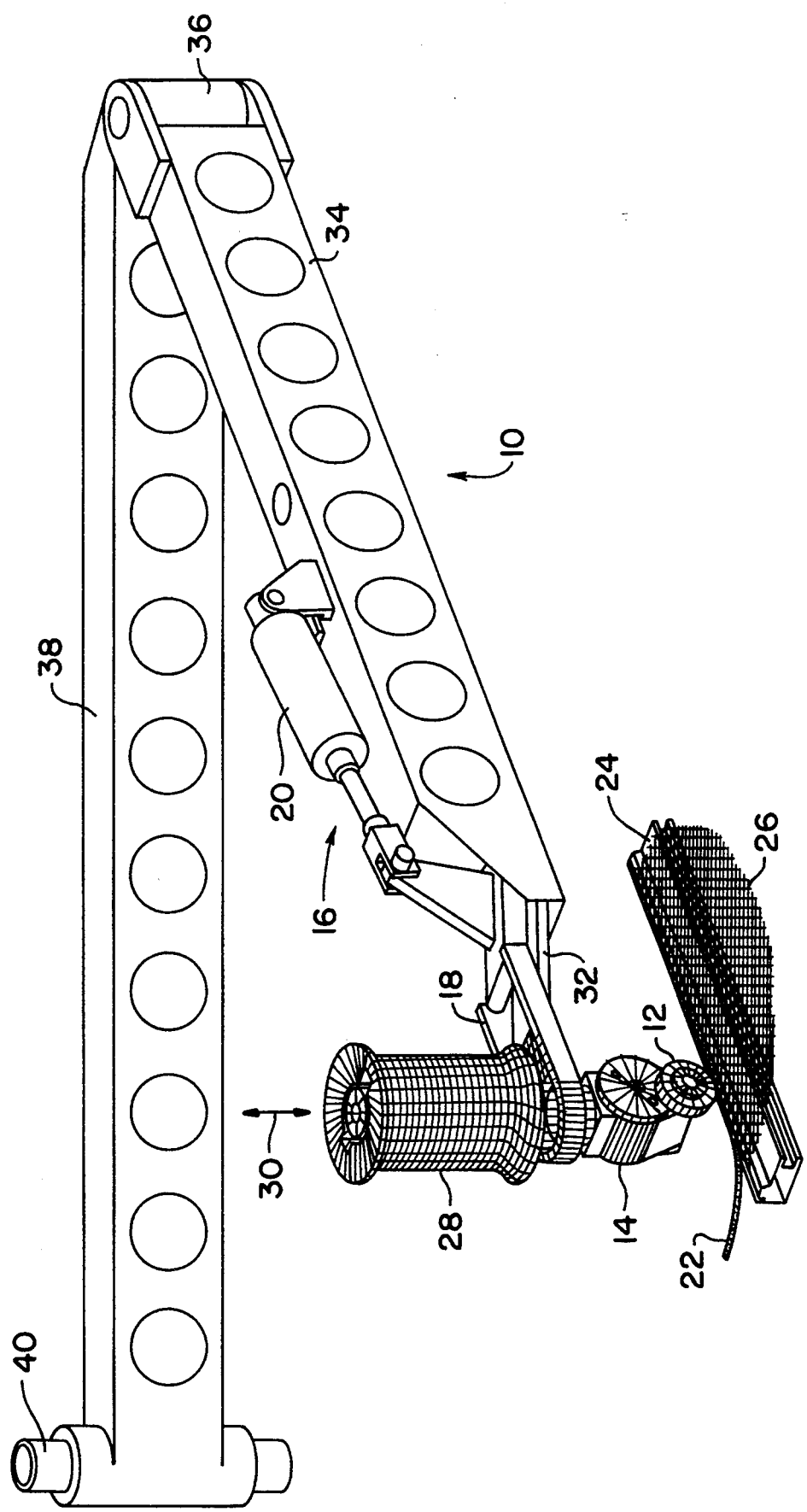
FIG. 1 shows a perspective view of the preferred embodiment of the invention.
Figure 3:
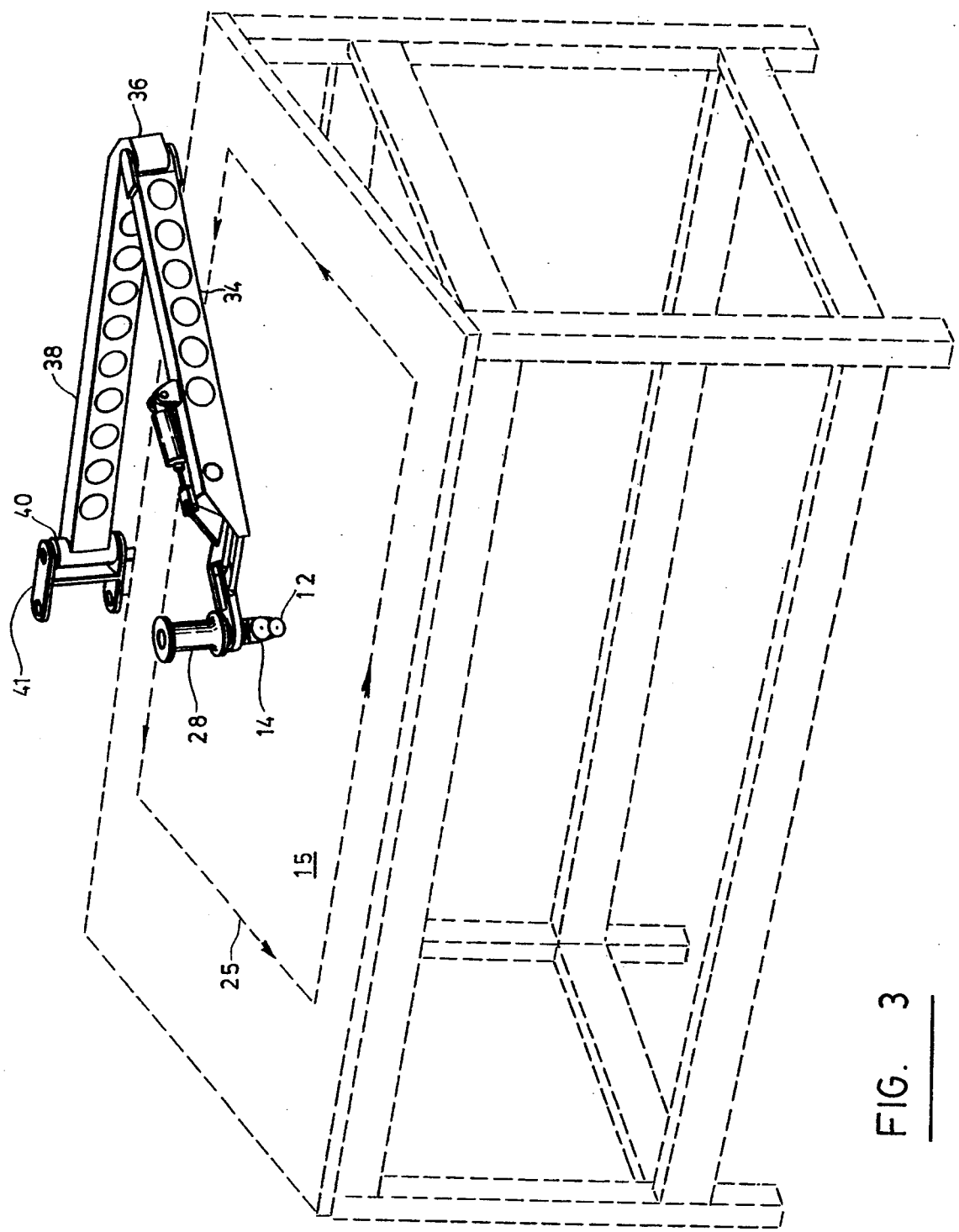
FIG. 3 is a perspective view of a supporting table having the preferred embodiment attached thereto.

As shown in FIG. 1, apparatus (10) comprises a spline inserting wheel (12) mounted to and driven by a pneumatic motor (14) rotatably mounted to mounting (18) connected to one end of support (16) moveable over a frame supporting table surface (see FIG. 3). An air cylinder (20) provides a downward force to the mounting (18) by applying a force to parallel arms (32) pivotably interconnected between mounting (18) and the end of support (16). Support (16) comprises a first articulated arm (34) connected to a second articulated arm (38) by a pivot joint (36), the second articulated arm (38) being anchored to a structure fixed with respect to the table surface by pivot (40). Handle (28) turns with motor (14) and wheel (12), although the handle may be slid vertically up and down.

Figure 2:
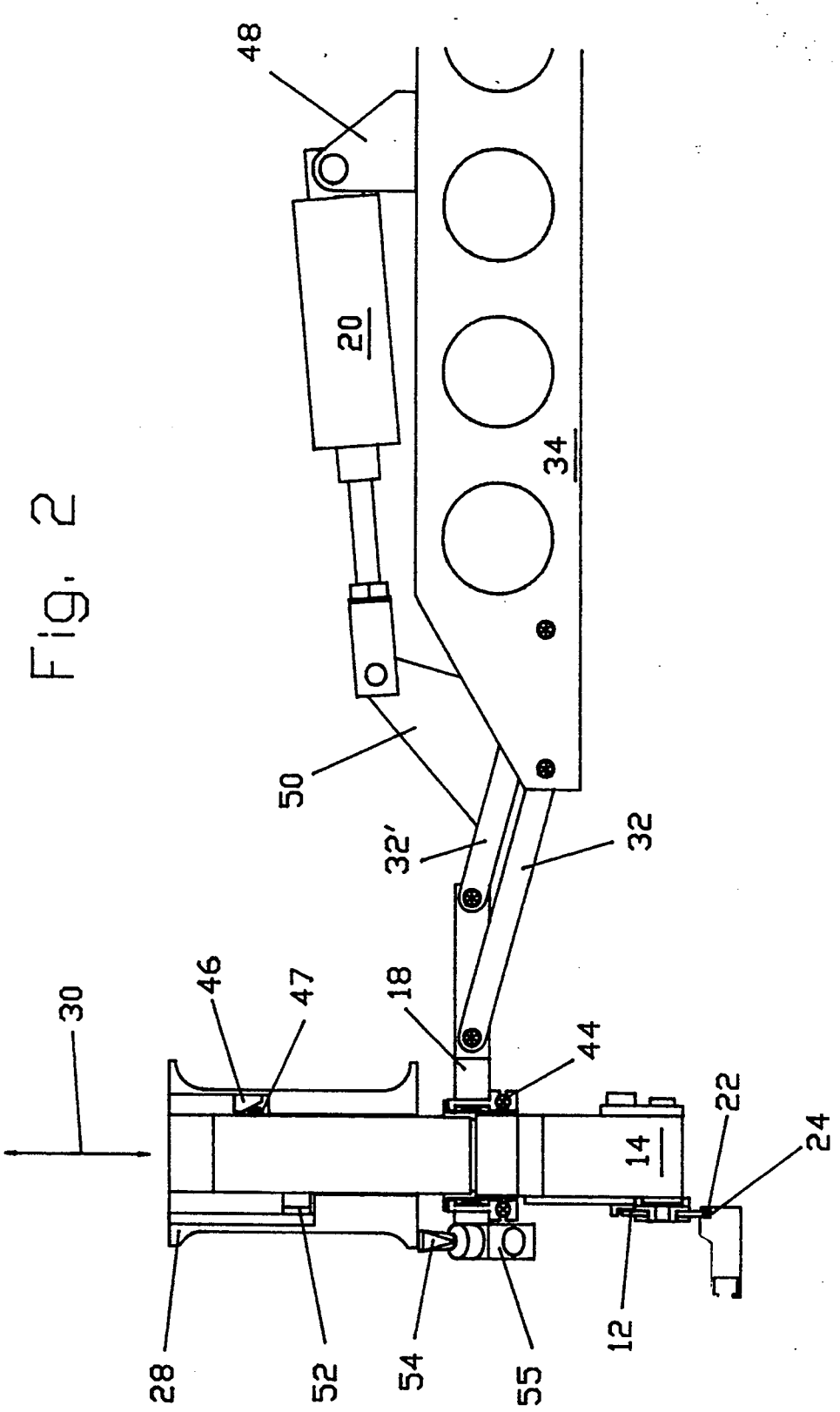
FIG. 2 is a detailed partially cross-sectional side view of the preferred embodiment.

As best shown in FIG. 2, the handle is shown in its uppermost extension, and as handle (28) is moved downward, a member (54) activates a pneumatic valve (55) allowing pressurized air to flow through conduits (not shown) to force air cylinder (20) to push down on member (50) connected to parallel arms (32) and (32'). With this first downward motion, pressure is applied to wheel (12) to force spline (22) into groove (24) of the screen frame extrusion. As handle (28) is further lowered, its linear motion is guided by a track (52), and a cam (46) presses in a pneumatic valve (47) turning on the pneumatic motor (14) geared to rotate wheel (12). At this point, wheel (12) will start turning and will advance along groove (24), and can be steered by turning handle (28). The motor, wheel and handle turn about axis (30), which is substantially perpendicular to table (15). As soon as handle (28) is released, the spring loaded valves (55) and (47) push handle (28) up such that the motor stops and then the force applied by air cylinder (20) is released.

When applying a rubber spline (22) to a rectangular frame covered with a screen (26), one end of the spline (22) is placed over groove (24) while the motor (14) and wheel (12) are positioned over the spline (22) using handle (28), and then lowering the handle a little, the action of air cylinder (20) forces the spline (22) into groove (24) and effectively locks the screen (26) with the spline (22) in groove (24). The initial spline insertion requires greater force than the advancing insertion, and consequently, one may carry out this initial step using a tool by hand without using the wheel (12). The spline (22) is then manually stretched out over groove (24) and then handle (28) is further depressed to cause motor (14) to advance wheel (12) along groove (24) causing spline (22) to be forced into groove (24) as it advances. Screen (26) may be held by hand to make sure the fastened screen surface is taught. Since the friction imposed by bearing (44) of mounting (18), and pivot joints (36) and (40) is minimal, the wheel (12) does not pull on screen (26) or the screen frame as the wheel is driven by motor (14). When the wheel (12) approaches a corner of the screen frame, handle (28) is lifted until motor (14) stops at which point the operator checks that the spline has been fully inserted right into the corner of the frame, failing which brief activation of the motor by pressing down on handle (28) is carried out to make wheel (12) advance fully into the corner. At this point, the handle (28) is fully released and the motor (14) handle and mounting (18) are all lifted while the wheel is repositioned to make the 90° turn for advancing along the next side of the frame, and the process is continued until spline (22) reaches the point near the first point where the spline (22) was inserted into groove (24), and then spline (22) is cut just before the last portion of spline (22) is inserted into groove (24). The outside excess portion of screen (26) is then cut off by knife to obtain the finished screen.

With reference to FIG. 3, the apparatus is shown along with the frame supporting table (15) according to the preferred embodiment. The frame supporting table (15) is set up in a landscape orientation and is of a size capable of supporting a sliding screen door frame. Table (15) is inclined at an angle between about 10° and 30° in order to facilitate working at the back of the table. The mounting (41) for receiving pivot (40) of the articulated arms (38) and (34) is provided in the middle at the rear of the table. The dimensions of the table and arms (38) and (34) are selected such that the contour of groove (24) (not shown for clarity) on the screen frame can be followed by wheel (14) by following a path (25).

As can be understood, in the preferred embodiment, the operator may place himself directly over groove (24) on three sides of the table, while the rear length is made accessible only from the front of the table. It is of course possible to provide a support mounted at a distance from the table allowing the operator to walk around the supporting table. It is also possible to use a transverse gantry and track for the support instead of the articulated arm. Such a gantry and track system could have the motor and wheel rotatably mounted to a carriage on the gantry which would be slideable in a transverse direction, the gantry being longitudinally mounted on a rail such that the carriage is displaceable over a surface of the supporting table on which the screen frame is placed. As can be appreciated, a single motor is required.

The means for applying a downward pressure on the wheel are shown in the preferred embodiment to comprise an air cylinder for applying a downward force between the parallel arms connected to the rotatable mounting and an end of articulated arm (34). It would of course be possible to use a pneumatic hydraulic or electric drive elsewhere on the articulated arm system such as at pivot (40). The means for applying a downward pressure can also be part of the motor and wheel unit, more particularly between bearing (44) and the motor and wheel handle unit. It would also be possible to provide manual means for applying a downward pressure, however, the automatic control of a mechanical system such as the pneumatic cylinder is preferred for speed and ease of control. Nevertheless, it is possible to replace pneumatic cylinder (20) by a manually engaged biassing system. The use of handle (28) and manual pressure as means for applying a downward pressure can work in a situation where the operator has close access around the entire frame, unlike the preferred embodiment where the rear side of the frame is remote from the operator standing at the front of the table.

What is claimed is:

1. An apparatus for inserting a spline into a frame groove, said apparatus comprising:
   a manually movable support operatively securable to a fixed structure and having a free end movable in a plane substantially parallel to a frame supporting table surface;
   an end element operatively secured to said free end, at least a part of said end element being manually rotatable about an axis substantially normal to said surface;
   a spline inserting wheel mounted on said rotatable part for engagement with the frame groove over the spline, said wheel being rotatable about an axis substantially parallel to said surface;
   means for applying a force urging said wheel into said frame groove; and
   a motor mechanically connected to said wheel for driving said wheel to rotate while said wheel is in said frame groove, said wheel being rotated for inserting the spline in said frame groove.

2. Apparatus as claimed in claim 1, wherein said support comprises a pair of articulated arms.

3. Apparatus as claimed in claim 1, wherein said means for applying a force comprise an air cylinder connected at said free end of said support and at said end element.

4. Apparatus as claimed in claim 1, further comprising a vertically sliding handle connected to said rotatable part, said handle activating a first and a second switch as it is slid from its uppermost position to its lowermost position, said first switch being activated before said second switch, said first switch activating said means for applying a force, and said second switch activating said motor.

5. An apparatus for inserting a spline into a frame groove, said apparatus comprising:
   a rectangular frame supporting table having an inclined surface having a lower front side and an upper rear side;
   a manually movable support operatively secured to the rear side of said table and provided with a pair of articulated arms, said support having a free end movable in a plane substantially parallel to the table surface;
   an end element operatively secured to said free end, at least a part of said end element being manually rotatable about and axis substantially normal to said surface;
   a spline inserting wheel mounted on said rotatable part for engagement with the frame groove over the spline, said wheel being rotatable about an axis substantially parallel to said surface;
   means for applying a force urging said wheel into said frame groove; and
   a motor mechanically connected to said wheel for driving said wheel to rotate while said wheel is in said frame groove, said wheel being rotated for inserting the spline in said frame groove.

6. Apparatus as claimed in claim 5, wherein said means for applying a force comprise an air cylinder connected at said free end of said support and at said end element.

7. Apparatus as claimed in claim 5, further comprising a vertically sliding handle connected to said rotatable part, said handle activating a first and a second switch as it is slid from its uppermost position to its lowermost position, said first switch being activated before said second switch, said first switch activating said means for applying a force, and said second switch activating said motor.

* * * * *